Aug. 13, 1968   J. C. DEAN   3,396,597
FLIGHT CONTROL LINKAGE FOR AIRCRAFT
Filed Jan. 17, 1966   2 Sheets-Sheet 1

INVENTOR
JAMES C. DEAN
BY M. B. Tasker
ATTORNEY

Aug. 13, 1968

J. C. DEAN 3,396,597

FLIGHT CONTROL LINKAGE FOR AIRCRAFT

Filed Jan. 17, 1966

INVENTOR
JAMES C. DEAN
BY M. B. Tasker
ATTORNEY 3,396,597
FLIGHT CONTROL LINKAGE FOR AIRCRAFT
James C. Dean, Stratford, Conn., assignor to United Aircraft Corporation, East Hartford, Conn., a corporation of Delaware
Filed Jan. 17, 1966, Ser. No. 521,185
5 Claims. (Cl. 74—469)

ABSTRACT OF THE DISCLOSURE

Dual flght controls for an aircraft include pairs of push-pull rods having their corresponding ends connected to lugs on the arms of a bell crank. The bell crank has a median web connecting its arms and the lugs are located on opposite sides of the web and at different distances from the pivot of the bell crank.

---

This invention relates in general to flight controls for aircraft and in particular to flight controls for helicopters.

Helicopters used in combat zones are particularly susceptible to ground fire because the combat missions assigned to helicopters usually involve close support for ground troops and hence flight at low altitudes.

In providing passive defense for a helicopter it is convenient to classify the control components as singular vulnerable components and multiple vulnerable components. Singular vulnerable components are those wherein a single hit by small arms fire will degrade or impair the performance of the control system below the grade necessary for safe flight. Multiple vulnerable components are those which require more than one hit to compromise flight safety. The Flex-Rotor$_{TM}$ control servo unit and the hydraulic mixing unit are considered singular vulnerable to small arms fire and, since they are relatively compact units, can be protected by armor plate. Likewise the two hydraulic power systems can be separated by armor plate to prevent damage to both systems from a single projectile.

Much of the flight control linkage, however, because of its extensiveness, cannot be protected by armor plate because to do so would require that the entire helicopter be armor clad, resulting in too great a weight penalty.

It is therefore an object of this invention to provide some measure of passive defense for these control linkages of a helicopter flight control system which fall in the category of singular vulnerable components but which, by reason of their nature or location cannot be protected by armor plate.

Small arms fire tests conducted on push rods show that projectiles pass completely through the push rod assembly, and sufficient material remains around the hole to enable the push rod to continue its normal function. If a push rod is cut on the periphery and a C-section results, the loading becomes more critical because the loading is eccentric to the rod axis. Fatique load tests of typical push rods that were damaged by gunfire were conducted at Sikorsky Aircraft Test Laboratory. With the improvements taught by this invention the results show that the push rods can withstand steady and vibratory loads for periods greater than the three-hour-long endurance mission even after a C-section has been created by gunfire.

The critical portion of a push rod was found by these tests to be the rod end which can be severed by a .30 caliber armor piercing projectile. Damage tests on control bell cranks show that the most vulnerable area is the clevis lug.

Another object of this invention is, therefore, the provision of a flight control system for an aircraft consisting of a bell crank and push rods in which the control components are capable of accepting small caliber projectile hits without failure by providing dual lugs on the bell crank arms and dual push rods pivoted to these lugs.

The use of bell cranks having multiple lugs to which dual push rods are attached can be made even more ballistic resistant if the dual push rods are connected to the bell crank arms at different elevations. This makes it highly improbable that a single-projectile hit will strike the bell crank at the angle required to damage both lugs on the bell crank. Gunfire tests on bell crank and push rod assemblies at the Ballistic Research Laboratory, Aberdeen, Md., demonstrated that a bell crank and push rod control system having the improved construction of this invention after being hit by .30 caliber armor piercing projectiles fired at service velocity and point blank range, still maintained its functional capacity. The tests also demonstrated that controls will remain functional after impact by a .50 caliber armor piercing projectile unless hit within a few degrees of the most unfavorable angle.

A further object of this invention is generally to improve the ballistic resistance of aircraft flight control components, consisting of bell cranks and push rods, by the use of multilevel dual devices.

Still another means for making a bell crank and push rod assembly more ballistic resistant was discovered in the tests conducted. It was found that by staggering the dual lugs on a bell crank arm so that the two lugs lie on opposite sides of the median plane of the bell crank the chances of a disabling projectile hit become even more remote.

Accordingly, a further object of this invention is to provide a bell crank having dual lugs on its arms which are staggered relative to the median plane of the bell crank.

A still further object of this invention is generally to improve the ballistic resistance of aircraft flight control components.

These and other objects and advantages of the invention will become evident or will be specifically pointed out in connection wtih the following detailed description of two embodiments of the invention illustrated in the accompanying drawings.

Figure 1:
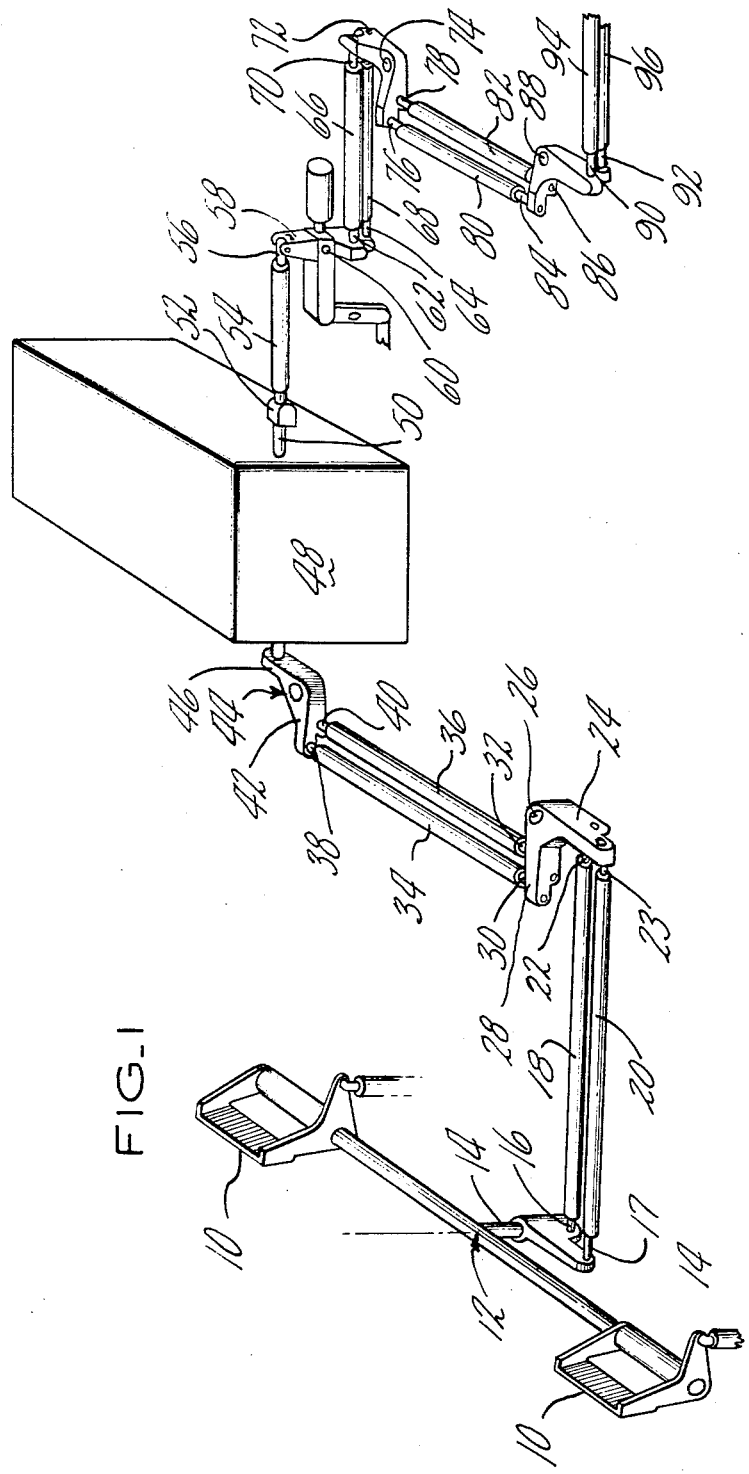
FIG. 1 is a somewhat fragmentary perspective view of one component of the flight control system of a helicopter illustrating the invention.

In FIG. 1 only enough of one component of the helicopter flight control system has been shown to illustrate the improved bell crank and push rod construction of the invention. It will be understood that similar multilevel, dual-lug bell cranks and push rods are used in the linkages of the collective and cyclic pitch controls and other controls in the flight control system. In the figure, part of the control linkage for the directional control system is shown including a pedal 10 pivoted at 12 which constitutes in effect one arm of a bell crank. The other and depending arm 14 is provided with dual lugs, hereinafter described in detail, to which are pivoted the adjustable clevis ends 16 and 17 of two parallel push rods 18 and 20. The other ends of these push rods have their clevis ends 22 and 23 pivoted in similar dual lugs of a depending arm 24 of a bell crank pivoted at 26. The angularly related arm 28 of this bell crank has dual lugs in which are pivoted the clevis ends 30 and 32 of a pair of parallel rods 34 and 36. These rods in turn have clevis ends 38 and 40 which are pivoted in dual lugs of an arm 42 of a bell crank pivoted at 44, the other arm 46 of which is connected to a push rod which extends into the hydraulic mixing unit 48.

A push rod 50 extends from the mixing unit and is connected at 52 with push rod 54 which has its axially adjustable end 56 pivoted to a lug 58 comprising the generally vertical arm of a bell crank pivoted at 60. A depending arm of this bell crank has dual lugs in which are pivoted the clevis ends 62 and 64 of a pair of push rods. Rods 66 and 68 have their other clevis ends pivoted in the dual lugs 70 and 72 of a bell crank pivoted at 74. This bell crank has its other and angularly related arm formed with dual lugs 76 and 78 to which are pivoted the adjustable clevis ends of two parallel rods 80 and 82. The clevis ends of those rods are pivoted to the dual lugs 84 and 86 of a bell crank pivoted at 88, the other and angularly related arm of which has dual lugs 90 and 92 in which are pivoted clevis ends of direction control actuating rods 94 and 96.

Figure 2:
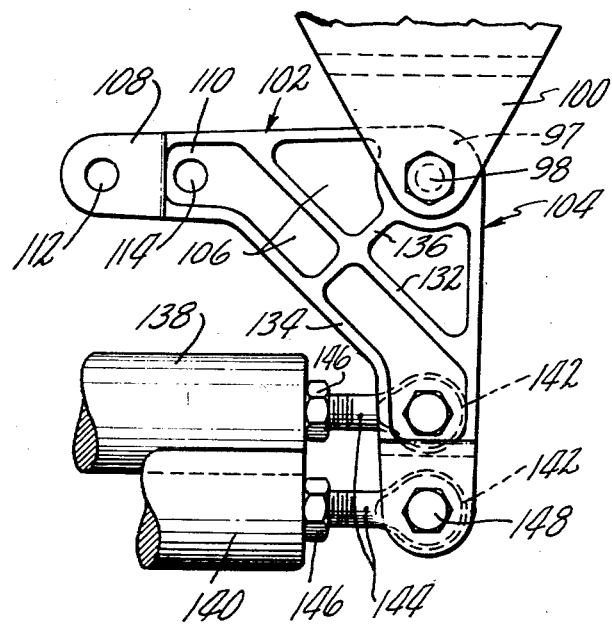
FIG. 2 is a side elevation of an improved bell crank having the multilevel dual lugs of this invention with dual push rods connected to one arm thereof.
Figure 3:
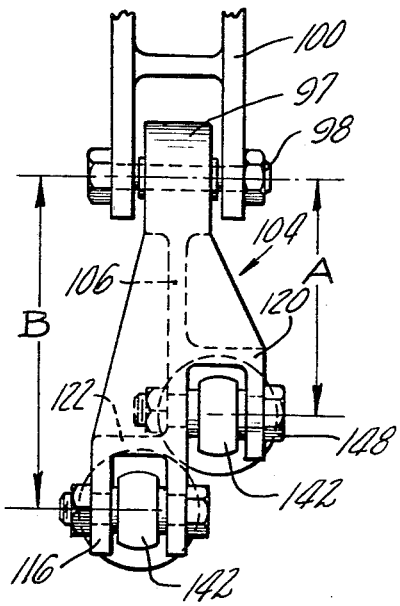
FIG. 3 is an end view of FIG. 2 showing the staggered relationship of the dual lugs.
Figure 4:
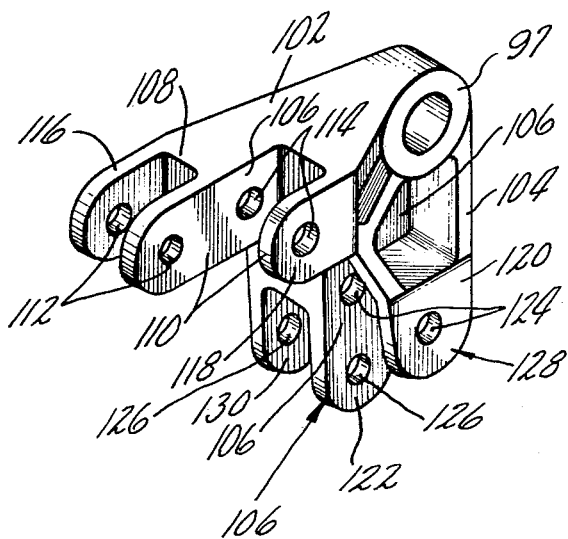
FIG. 4 is a perspective view of the bell crank of FIGS. 2 and 3.

From the above description of FIG. 1 it will be clear that, except for the immediate vicinity of the mixing unit, which is protected by armor plate (not shown), the linkage comprises dual lug bell cranks and dual push rods connected with these bell cranks. FIGS. 2, 3 and 4 show in detail one of the improved dual-lug bell cranks of this invention and a pair of push rods connected to one of the bell crank arms. The bell crank has a hub 97 which is pivotally mounted by a bolt 98 on a bracket 100 and two arms 102 and 104 which are here shown at right angles to each other. A central web 106 extends from the hub to the ends of the two arms of the bell crank (FIG. 3). Arm 102 has two bifurcated clevis-end receiving lugs 108 and 110 (FIG. 4) which have pivot pin receiving apertures 112 and 114 therein, respectively, located at different distances from the bell crank pivot 98 as best shown in FIG. 2. It will be noted that the central web 106 is common to and forms one side or furcation of both lugs, and that the other side of lug 108 is formed by an offset web 116 on one side of central web 106 while the other side of lug 110 is formed by an offset web 118 on the opposite side of central web 106.

Arm 104 has two similar clevis-end receiving lugs, i.e., a bifurcated lug 120 and a bifurcated lug 122 which have pivot pin receiving apertures 124 and 126 therein, respectively, located at different distances A and B (FIG. 3) from bell crank pivot 98. Central web 106 is common to and forms one side of both lugs, the other side of lug 120 being formed by an offset web 128 while the other side of lug 122 is formed by offset web 130.

Suitable webs are provided at top and bottom of each arm connecting the offset webs 116 and 118 and 128 and 130 to the central web 106. Also additional web structure including webs 132 and 134 and radial web structure 136 (FIG. 2) is provided for interconnecting the two arms 102 and 104 and the hub structure 97.

Parallel rods 138 and 140 are shown connected to arm 104. Each rod has a clevis eye 142 at one end of a clevis rod 144 which is threaded into the rod to provide adjustment for the length of the rod. A lock nut 146 is provided, as usual, to secure the clevis rod in adjusted position. Each clevis eye is received in one of the lugs 120 or 122 and a bolt 148 extends through the lug apertures and through the clevis eye to provide the pivotal connection.

Figure 5:
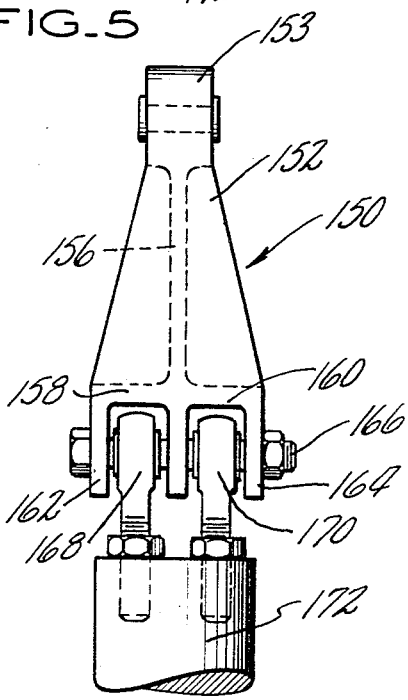
FIG. 5 is a modified construction which may be used to advantage in a helicopter flight control system.

In FIG. 5 a modified construction has been shown which, while not preferred, may be found useful under some conditions. This figure shows an end view of a dual-lug bell crank 150, a depending arm 152 of which is shown in this figure. The bell crank has a hub 153 by which it is pivotally mounted on fixed structure, not shown. The two arms of the bell crank are similar except for position. Each includes a central web 156 which extends from the hub to the end of the arm where dual lugs 158 and 160 are formed by parallel off-set webs 162 and 164 on opposite sides of central web 156. These two side-by-side lugs are provided with a bolt receiving aperture to receive a single pivot bolt 166 extend through the clevis eyes 168 and 170 of two clevis rods which are threaded into a push rod 172 common to both clevis rods. While the FIG. 5 construction does not provide all the protection against projectile hits present in the FIGS. 2, 3 and 4 construction, it does provide considerable assurance that the linkage will survive a direct hit since rod 172, due to its large diameter, will take a direct hit by a .30 or .50 caliber projectile without failure and a single hit at the clevis rod ends would be very unlikely to sever both rods.

In use the flight control linkage above described provides bell cranks and push rods capable of accepting small caliber projectile hits with very little chance that a failure of the linkage will occur. It will be noted that the two rods 138 and 140 (FIG. 2) are connected to the bell crank arm at different elevations which makes it very unlikely that both could be disabled by a single projectile. Also from an inspection of FIG. 3 it will be appreciated that the two clevis rod ends 144, which are the vulnerable parts of the push rods, are staggered, being located on opposite sides of central web 106. As a result there is very little chance that a single projectile could disable both push rods 138 and 140 at their threaded ends. Further the bell crank, by reason of its massive metal section in the vicinity of the threaded rod ends due to the dual bifurcated lug structure provides additional assurance that no single hit by small arms fire will cause failure of the bell crank.

From the above description of two embodiments of the invention it will be evident that a flight control linkage for helicopters has been provided which establishes a dual line of control from the pilot's compartment to the flight component being controlled without unduly increasing the weight or the complexity of the controls.

It will further be evident that the dual-lug bell crank construction of this invention provides increased protection to the linkages at the threaded clevis ends, where they are most vulnerable to small arms fire, while at the same time greatly reinforcing the bell crank itself against a crippling hit.

Although the invention has been described in connection with helicopters, it will be understood that the construction disclosed may be used advantageously in other aircraft. Also, while only two embodiments of the invention have been shown and described herein, it will be understood that many changes may be made in the construction and arrangement of the bell cranks and push rods without exceeding the scope of the invention as defined in the following claims.

I claim:

1. A dual flight control linkage for aircraft including a bell crank having a hub and angularly related arms extending from said hub, means for pivoting said bell crank on fixed structure of the aircraft including a pivot, the axis of which extends through said hub, said bell crank having a median web connecting said arms, each arm having a lug located on each side of said web and at different distances from the axis of said pivot, and two push rods for each arm, each having an end pivotally connected to a different one of said lugs.

2. A dual flight control linkage for aircraft including a bell crank having a hub and two angularly related arms extending from said hub, pivot means the axis of which extends through said hub for pivoting said bell crank on fixed structure of the aircraft, said bell crank having a web common to both of said arms, at least one of said arms having two bifurcated lugs, each having pivot means for attaching the end of a push rod thereto, said lugs having their pivot means at different distances from the pivot means for said bell crank and said web forming one furcation for both of said lugs.

3. The flight control linkage of claim 2 in which the web of the bell crank lies in a median plane of the bell crank and the lugs on each of the arms are located on opposite sides of said web.

4. A flight control linkage for aircraft including a bell crank having a hub and two angularly related arms extending from said hub, pivot means for said bell crank the axis of which extends through said hub, each of said arms having a median web and two lugs located on opposite sides of said web and at different distances from the pivot means for said bell crank.

5. The flight control linkage of claim 4 in which the lugs are bifurcated and the median web forms one furcation of both lugs.

References Cited

UNITED STATES PATENTS

| 1,869,871 | 8/1932 | Stout | 244—83 X |
| 2,541,827 | 2/1951 | Mosso et al. | 74—519 X |
| 2,959,230 | 10/1960 | Doman | 244—83 X |

FOREIGN PATENTS

| 792,360 | 3/1958 | Great Britain. |

MILTON KAUFMAN, *Primary Examiner.*